March 12, 1968  A. SOODALTER  3,372,843
FOOD DISPENSING APPARATUS
Filed Sept. 27, 1967  3 Sheets-Sheet 1

INVENTOR.
ARNOLD SOODALTER
BY Kenwood Ross and
Chester E. Flavin
ATTORNEYS.

March 12, 1968  A. SOODALTER  3,372,843
FOOD DISPENSING APPARATUS

Filed Sept. 27, 1967  3 Sheets-Sheet 2

INVENTOR.
ARNOLD SOODALTER
BY Kenwood Ross and
Chester E. Flavin
ATTORNEYS.

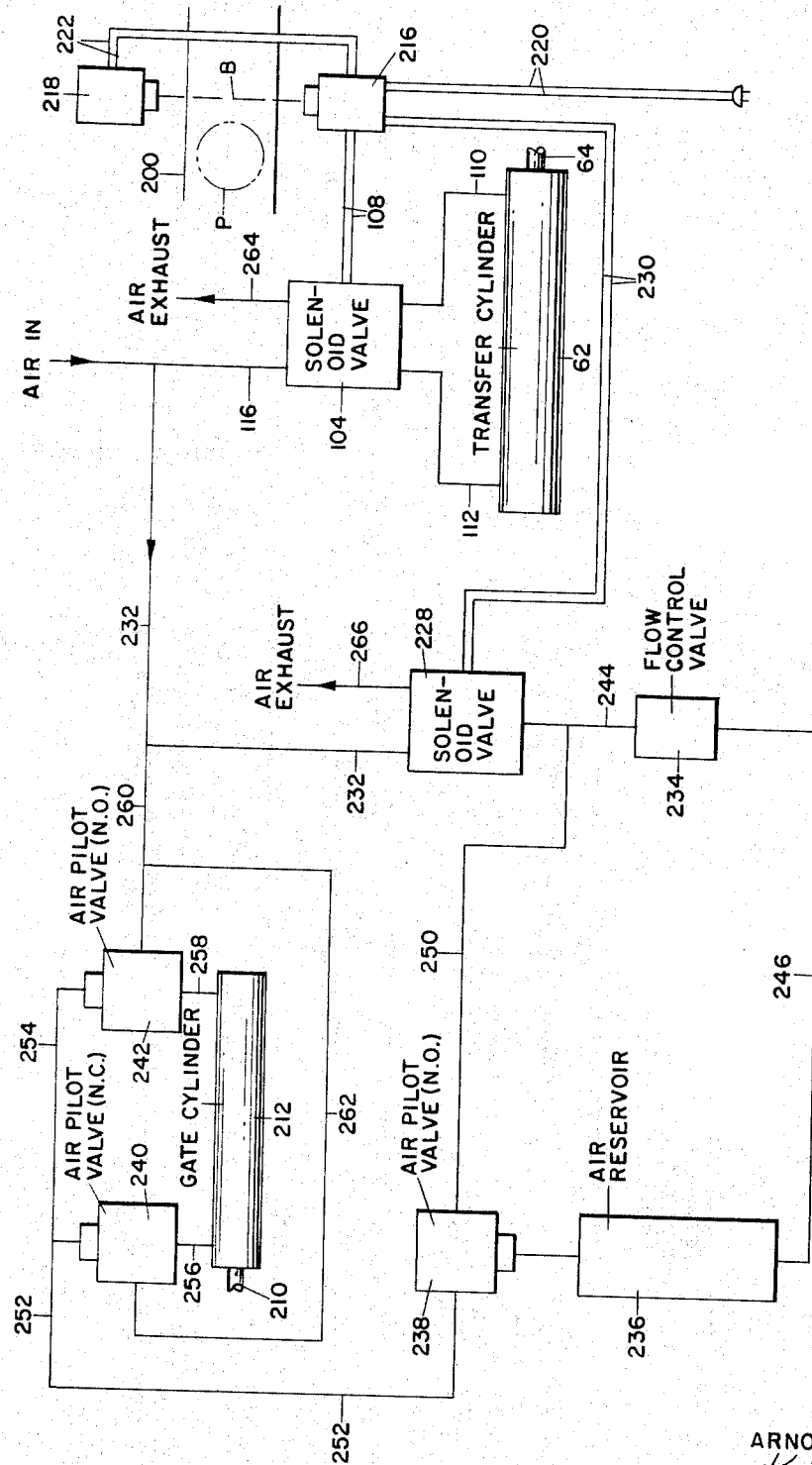

United States Patent Office 3,372,843
Patented Mar. 12, 1968

3,372,843
FOOD DISPENSING APPARATUS
Arnold Soodalter, 134 Tanglewood Drive,
Longmeadow, Mass. 01106
Continuation-in-part of application Ser. No. 612,928, Jan. 31, 1967. This application Sept. 27, 1967, Ser. No. 670,964
2 Claims. (Cl. 222—309)

ABSTRACT OF THE DISCLOSURE

Apparatus for forcibly dispensing a first food substance with respect to a second food substance, the first substance being contained in a pressurized container and periodically charged therefrom and through a transfer chamber for dispensing in measured incremental amounts onto or into the second food substance, the apparatus comprising: spring-loaded valve means in each of an outlet of the pressurized container and an outlet of the transfer chamber, an air-actuated transfer cylinder having a piston reciprocable within the transfer chamber for sequentially opening one valve for drawing a charge of the first food substance from the pressurized container and into the transfer chamber and opening the other valve for expelling the charge from the transfer chamber to a nozzle, an air-actuated gate cylinder for closing the nozzle, and a photoelectric signal means for controlling and synchronizing the movements of the transfer cylinder and gate cylinder according to the positioning of the second substance relative to the nozzle.

CROSS REFERENCES TO RELATED APPLICATIONS

This is a continuation-in-part of my copending application, Ser. No. 612,928, filed Jan. 31, 1967.

BACKGROUND OF THE INVENTION (1) *Field of the invention*

The invention relates to dispensing apparatus for forcibly dispensing a measured amount of liquid, liquid pulp, pulp or liquid suspended solids, the dispensed material, being injected into or deposited or sprayed or forcibly expelled upon another material or being dispensed directly into a receptacle, as may be desired.

(2) *Description of the prior art*

Apparatus has been known for spraying or diffusing one substance upon another or into a receptacle. However, in the food processing field, a need has long been felt for a machine which would quickly, reliably and automatically dispense coating substances of various types and consistencies in controllable predetermined measured amounts.

SUMMARY OF THE INVENTION

Apparatus for dispensing a first substance of liquid or liquid pulp or pulp or liquid suspended solids onto a second substance or into a receptacle in controllable predetermined measured amounts in timed conjunction with other related movements.

BRIEF DESCRIPTION OF THE DRAWINGS

FIG. 5 is a diagrammatic view, showing a typical installation of the portioned product feed and dispensing control means of the equipment.

DESCRIPTION OF THE PREFERRED EMBODIMENTS

Figures 1, 2:
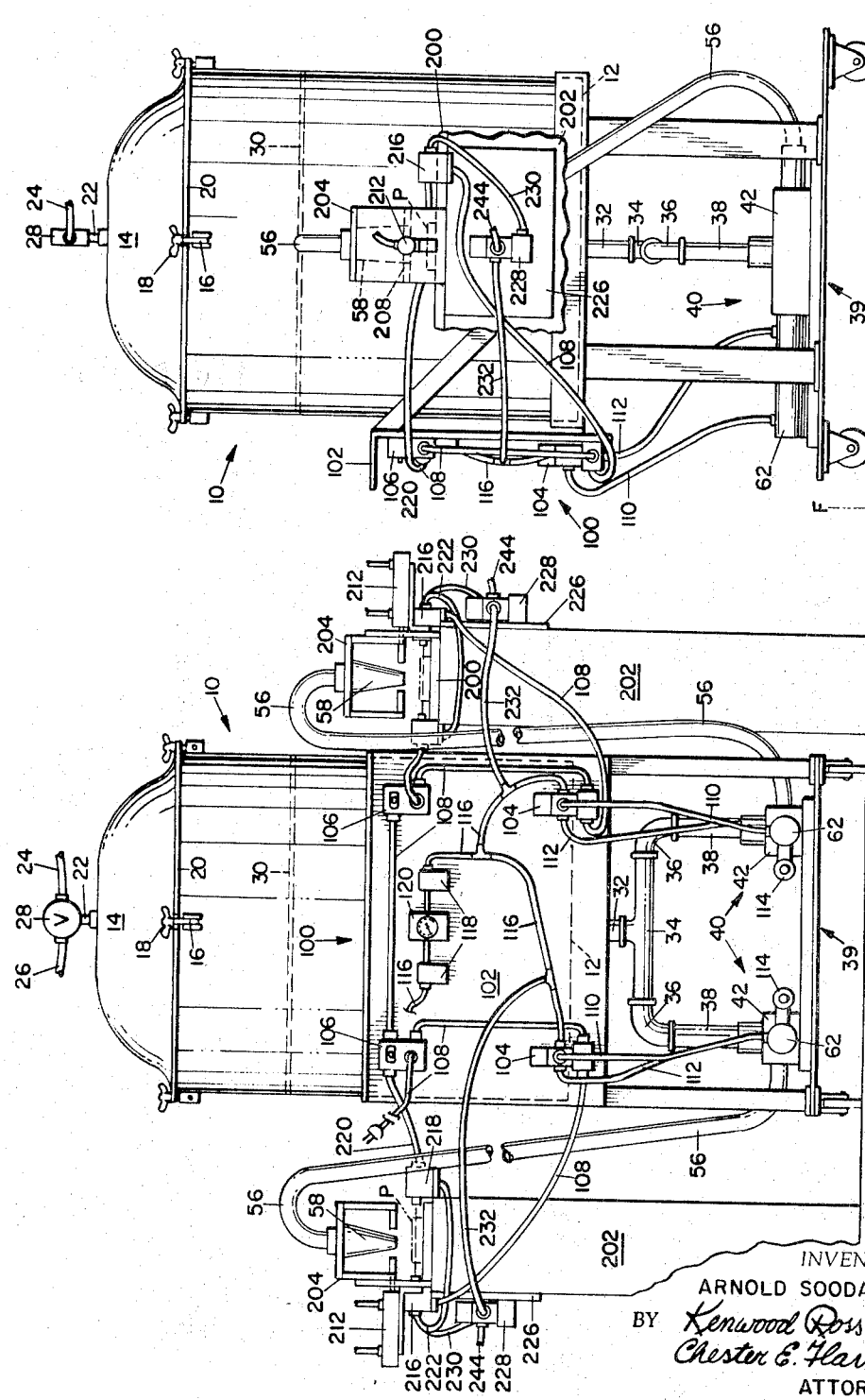
FIG. 1 is a fragmentary view in front elevation, of the apparatus of the invention.
FIG. 2 is a view thereof, in side elevation.

The apparatus is designed primarily for applying a coating of one food substance upon, and/or mixing it with, another food substance, and while the seasoning or flavoring of meat products (i.e. a viscous material coated upon a hamburg patty) is primarily envisioned, I do not wsih to be limited thereto. For instance, the apparatus is adapted for filling receptacles.

The coating substance may include any liquid, liquid pulp, pulp or liquid suspended solids, and in the case of food substances, may be in raw or cooked form and in either a hot or cold state.

The apparatus operates, in timed conjunction with the feeding thereto of the product to be coated or the receptacle to be filled, a conveyor or other means for feeding the product to a dispensing station where the dispensing of a measured, predetermined, adjustably controllable amount of the coating substance takes place.

The apparatus includes a closed, pressurized container for containing the substance to be dispensed, a product transfer means for transferring the substance from the container to a dispensing nozzle or spreader, a means for feeding the product to be coated or the receptacle to be filled to the nozzle, and a means for controlling the opening and closing of the nozzle and hence the dispensing of the substance therefrom in timed relation with the movement of the product to be coated or the receptacle to be filled relative to the nozzle.

The container is generally indicated by 10. Only one thereof has been shown although it will be understood that two or three or more thereof may be operated in tandem so that, as one container is emptied, another may be quickly connected to the product transfer means, thereby materially reducing downtime.

Container 10, which may be cylindrical or otherwise, is closed at its bottom by a bottom wall 12 and at its top by a removable cover 14, an air tight seal between the two members being insured by suitable clamping means, as for example, clampdown bolts 16 hinged to the container wth wing nuts 18 threaded thereon for bearing relationship with a peripheral flange 20 of the cover.

Container 10 may be pressurized as by air fed thereinto through an air inlet 22 in cover 14, the air inlet being connected via an air supply line 24 to a source of air under pressure. Air may be exhausted from the container by means of an air exhaust line 26. A valve 28 is disposed between air inlet 22 and air supply line 24 and air exhause line 26 for air presure control purposes.

A movable, air-pressure actuated, piston-like member 30 is disposed within the container and may be brought to bear upon the upper surface of the contained coating substance so that when air pressure is imposed thereabove, an equally distributed downward pressure is applied on the coating substance.

While an air-pressure actuated arrangement is shown, it will be understood that a mechanically operated piston could be employed for the same purpose. Also, a diaphragm principle might be employed in certain cases.

A suitable alarm or signalling device, not shown, conceivably would be employed to alert the operator when the contained coating substance reached a predetermined level of depletion.

An outlet in the form of a pipeline 32 is provided in the bottom wall of container 10 for permitting egress of the coating substance therefrom.

The container preferentially is supported upwardly of flooring F by a suitable framework 39 which also serves to support the product transfer means generally indicated by 40.

A dual product transfer system is shown as being connected to outlet 32, it being understood that a single, triple or other system may be employed to meet individual requirements. Further, when two or more containers are utilized, suitable coupling means would be employed to facilitate ready switching between containers.

In the dual system shown, a T-coupling 34 and elbows 36 connect outlet 32 to the upper ends of product transfer pipelines 38, 38 which are, in turn, connected at their lower ends to product transfer means 40, 40.

Here following, only one of the product transfer means will be described, they being identical in all respects.

Product transfer means 40 includes a transfer housing 42 having an annular horizontally-extending piston channel 44 projecting inwardly from one end thereof. The piston channel communicates with a transfer chamber 46 provided centrally of the transfer housing and also communicates with an annular channel 48 provided at the opposite end of the transfer housing and axially aligned with piston channel 44. An upright annular boss 50 provided on the upper side of the transfer housing circumscribes an inlet channel 52 which communicates with transfer chamber 46 and the lower extremity of product transfer pipeline 38 is sleeved on the boss thereby affording communication between container 10 and transfer housing 42. An annular boss 54 circumscribes exit channel 48 and has the inboard end of a flexible hose 56 sleeved thereon. The opposite, outboard end of the hose will be seen to carry a spreader or nozzle or dispensing head 58.

Transfer pipeline 38 and hose 56 are fixed to bosses 50 and 54 respectively by clamps 60.

An air cylinder 62 fixed to and axially aligned with one end of housing 42 mounts a piston shaft 64 carrying a piston 66 slideably reciprocable within and relative to piston channel 44 of the transfer housing.

Mushroom type valves 70 are disposed in the lower end of pipeline 38 and in the inboard end of flexible hose 56 and each comprises an annular valve housing 72, open at one of its ends and closed at its other end by a disc-like wall 74, the wall having a central opening therethrough defining a seat 76.

The outer diameter of valve housing 72 is slightly greater than the inner diameters of pipeline 38 and flexible hose 56 wherefore the valves, upon insertion, will be tightly embraced. Clamps 78 circumscribes the ends of the pipeline and the hose to lock the respective valve in situ.

A mushroom valve 80 seats in seat 76 and is urged into seating engagement by a compression spring 82, which spring sleeves a tubular extension 83 formed integrally with and extending outwardly from the flat surface of the hemisphere.

The free end of a pin 84 is slideably receivable within tubular extension 83, the pin being fixed at its opposite end to a pin bar 86 fixed to one end of a tubular retainer 88 sleeved by valve housing 72. A retainer ring 90 disposed at the open end of valve housing 72 holds the valve components in place. The free end of pin 84 is slideably receivable in tubular extension 83 and in a central opening 92 extending inwardly from the flat surface of valve 80.

One end of spring 82 engages the flat surface of the hemisphere and the opposite end thereof engages pin bar 86, wherefore the spring urges the valve into the seat.

Figure 3:
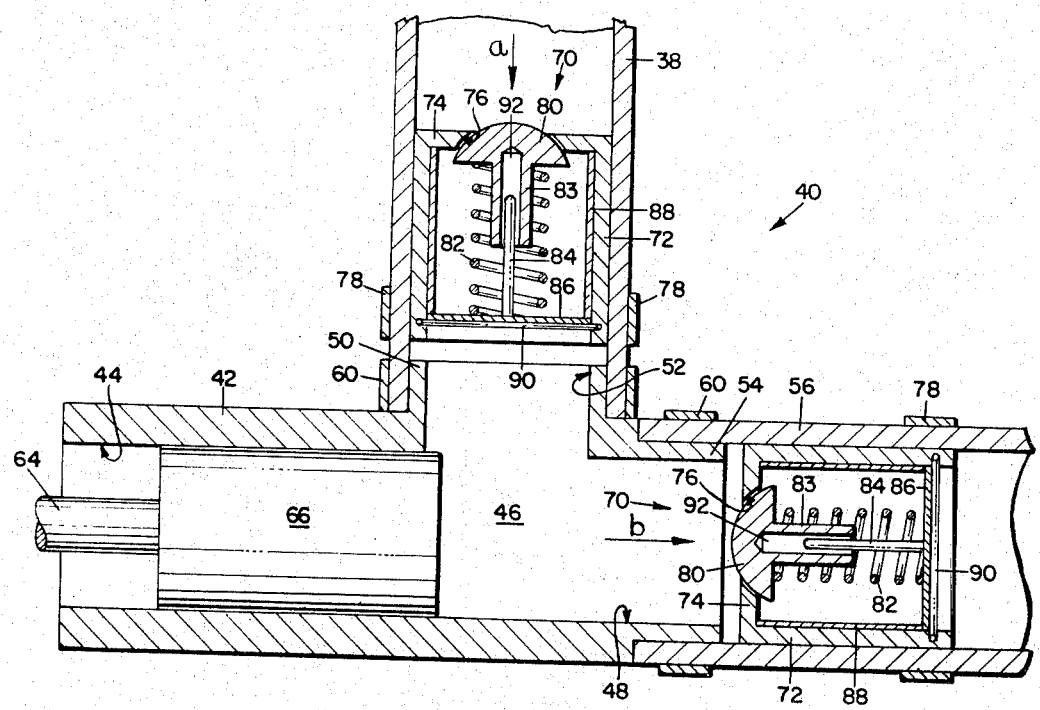
FIG. 3 is an enlarged, fragmentary view, in cross section, taken through the product transfer means of the equipment.
Figure 4:
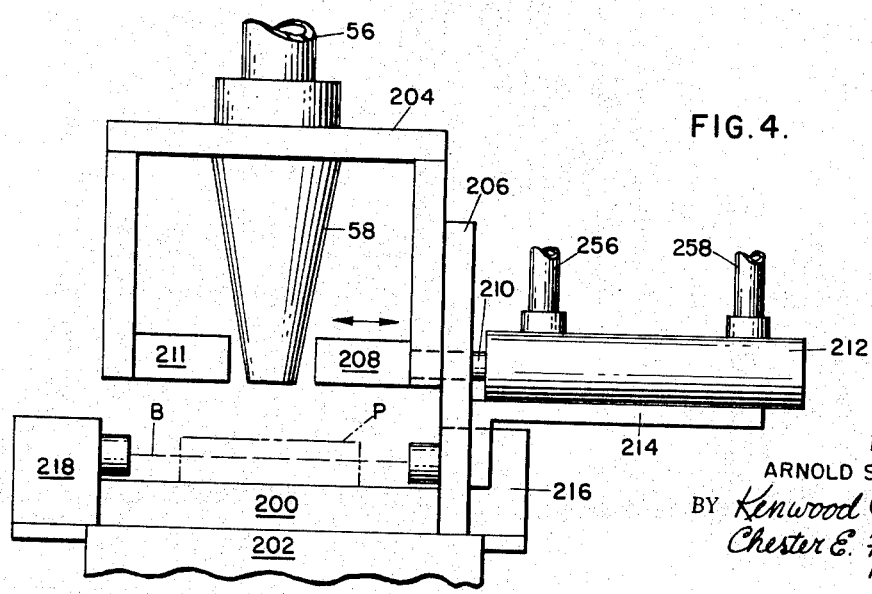
FIG. 4 is an enlarged, fragmentary view, in front elevation, of the dispensing gate or nozzle and cylinder therefor.

Pressure against the valves in the directions of the arrows a and b respectively in FIG. 3 moves the valves out of the seats, the valves sliding relative to the pins 84, permitting the passage of material through the valves. When this pressure is removed, the springs return the valves to seating positions.

A heavier compression spring 82 is employed in the case of valve 70 in hose 56 than is employed in the case of valve 70 in pipeline 38 so that the valve in the hose will not be opened by the pressure of the product in the transfer chamber, but rather will open only when piston 66 exerts added pressure upon the product.

The inlet and outlet channels of the transfer housings may be reversed by the simple expedient of reversing the directions of the valves should it be desired to feed into the transfer housing through channel 48 and to dispense therefrom through channel 52.

On the retrograde stroke of piston 66, the pressure of the material in pipeline 38 on the valve disposed in its lower end is sufficient to open the valve permitting the material to pass through the valve and inlet channel 52 of transfer housing 42 and into transfer chamber 46 of the housing. However, such pressure will not be sufficient to open the valve in flexible hose 56.

The return stroke of piston 66 exerts a sufficient pressure on the material in the transfer chamber as to close the valve in pipeline 38 and to open the valve in flexible hose 56, whereupon the material in the transfer chamber is forced from the chamber through outlet channel 48 and valve 70 in the inboard end of flexible hose 56 and into the hose and same is dispensed therefrom through nozzle or spreader 58.

On the retrograde stroke of the piston, the valve in pipeline 38 is open and that in the flexible hose is closed; on the return stroke of the piston, the valve in the pipeline is closed and that in the flexible hose is open.

A traveling conveyor 200 is disposed at each side of container 10, each conveyor being supported upwardly of floor F by a stand or table 202.

An open housing 204 is held in vertically spaced relation to each conveyor by a bracket 206 fixed to a respective stand or table 202. Each nozzle or spreader 58 is fixed in vertically-depending manner to a respective one of said housings so that the lower end of the nozzle or spreader is spaced above its respective conveyor.

Nozzles or spreaders 58 are tubular and are preferably formed from resilient compressible rubber or plastic material so that the lower ends thereof may be readily closed off and opened.

The means for closing the lower ends of the nozzles comprises a gate 208 fixed to the outboard end of a piston rod 210 of a horizontally-disposed gate cylinder 212 mounted on a bracket 214 fixed to housing bracket 206. Gate 208 is aligned with an anvil block provided on a housing 204, with the lower end of the nozzle being disposed between the gate and the anvil block.

On the forward stroke of the piston of the gate cylinder, the gate is moved horizontally inwardly and the lower end of the nozzle is pinched or pressed between the gate and the anvil so as to close off the nozzle. On the retrograde stroke of the piston of the gate cylinder, the gate is moved away from the nozzle and the nozzle opens automatically due to its inherent resiliency and due to the pressure of the coating substance being dispensed therethrough.

Signal means is provided on each conveyor, forwardly of the nozzles, for indicating the presence on the conveyor of a product to be coated or receptacle to be filled and comprises a photoelectric cell 216 fixed at one side of the conveyor and an aligned light source 218 fixed at the other side thereof. The light source emits a beam B which travels transversely across the conveyor in the path of the products or receptacles being carried by the conveyor.

Cell 216 is connected to a source of electrical power by lines 220 and is connected to the light source by lines 222.

The signal means is linked to a first control means 100 for transfer cylinders 62 and to a second control means 224 for gate cylinders 212. First control means 100, for controlling the actuation of the pair of air cylinders 62, is mounted on a control panel 102 provided at the forward side of container 10 and suitably secured to framework 39, and includes a solenoid valve 104 connected to cell 216 by electric lines 108 which may pass through junction boxes 106.

Solenoid valve 104 is connected to the forward and rearward ends of air cylinder 62 by air lines 110 and 112 respectively.

Piston control means 114 is provided on each air cylinder 62 whereby the length of the piston stroke may be varied when the piston is either in motion or stationary.

Air from a pressurized source, not shown, is fed to solenoid valve 104 through air lines 116, the air being filtered through filters 118.

A pressure gauge and air regulator is disposed along the air lines 116 for purposes of air pressure control.

Second control means 224, for controlling the gate cylinders 212, is mounted on a control panel 226 provided on each conveyor stand or table 202, and includes a solenoid valve 228 connected to cell 216 by electric lines 230 and connected to gate cylinder 212.

An air line 232 couples solenoid valve 228 to air line 116.

An air flow control valve 234, an air reservoir 236 and three air pilot valves 238 and 240 and 242, are disposed between solenoid valve 228 and gate cylinder 212.

An air line 244 joins solenoid 228 to air flow control valve 234; and air line 246 joins the flow control valve to air reservoir 236; and an air line 248 joins the air reservoir to air pilot valve 238.

Air pilot valve 238, which is normally-open, is connected to air line 244 by an air line 250 and is connected to air pilot valve 240, which is normally-closed, by an air line 252.

Air pilot valve 240 is connected to air pilot valve 242, which is normally-open, by an air line 254 and to the forward end of gate cylinder 212 by an air line 256.

Air pilot valve 242 is connected to the rearward end of the gate cylinder by an air line 258.

An air line 260 joins air pilot valve 242 to air line 232 and an air line 262 joins air pilot valve 240 to air line 260.

Suitable air exhaust lines 264 and 266 are provided for the solenoids 104 and 228 respectively.

From the above, it will be apparent that both transfer cylinder 62 and gate cylinder 212 are linked to each other and both are linked to the signal means.

For the purposes of orientation, let it be assumed that, in the starting positions of the components, solenoid valve 228 is open, normally-open air pilot valve 238 is closed, normally-open air pilot valve 242 is open, and normally-closed air pilot valve 240 is closed. In this instance, gate cylinder 212 and transfer cylinder 62 are extended and beam B of the electric eye is uninterrupted. All air lines are pressurized except lines 252 and 110, which are exhausted.

Sequentially, as the operator starts the machine, a portioned product or receptacle P is dropped upon moving conveyor 200 and when portioned product P has moved so as to interrupt beam B, solenoid valve 104 is shifted, line 110 is pressurized and line 112 is exhausted so as to retract transfer cylinder 62.

At the same time, solenoid valve 228 is deenergized, lines 244 and 248 are exhausted, and normally-open air pilot valve 238 is opened.

When the portioned product clears beam B, solenoid valve 104 is deenergized, line 112 is pressurized, and line 110 is exhausted whereupon transfer cylinder 62 is extended to force the coating substance from the transfer housing to nozzle 58.

Concurrently, normally-closed solenoid valve 228 is opened to pressurize lines 244 and 248 to cause air to flow through normally-open air pilot valve 238 so as to pressurize line 252.

Pressure in line 252 causes the normally-open air pilot valve 242 to close and to open the normally-closed air pilot valve 240, thus causing gate cylinder 212 to retract the gate and to open the nozzle.

Concurrently, pressure in line 244 flows through flow control valve 234 and line 246 into air reservoir 236 to pressurize line 248 and to close the normally-open air pilot 238.

It will be understood that the gate will remain open so long as normally-open air pilot valve 238 is open.

Flow control valve 234 controls the length of time required to fill air reservoir 236 and to bring line 248 to pressure so as to close normally-open air pilot valve 238.

When normally-open air pilot valve 238 closes, line 252 is exhausted so as to allow normally-open air pilot valve 242 to open and normally-closed air pilot valve 240 to close, whereupon cylinder gate 212 extends and the gate closes.

The cycle is completed and continues to repeat as long as the conveyor moves portioned products through the beam of the electric eye.

I claim:

1. Apparatus for transferring measured increments of a first food substance with respect to and in timed relation with the operating cycle of a second food substance handling machine dispensing increments of a second food substance comprising:

(a) a pressurized container for containing the first food substance;

(b) a dispensing head for dispensing increments of the first food substance with respect to dispensed increments of the second food substance;

(c) a transfer housing intermediate and communicating with the container and dispensing head for transferring the first food substance therethrough from the container to the dispensing head;

(d) a piston reciprocally receivable within the transfer housing;

(e) an air cylinder for loading the piston and imparting a feeding stroke in one direction and a non-feeding stroke in an opposite direction;

(f) control means for controlling the actuation of the air cylinder alternately in feeding and non-feeding directions responsively to the stop and go movements of the second food substance handling machine;

(g) a first pressure-operable by-pass valve disposed between the dispensing head and transfer housing and operative by a spring of relatively great tension and being in a normally-closed position with respect to communication between the transfer housing and dispensing head;

(h) a second pressure-operable by-pass valve disposed between the container and transfer housing and operative by a spring of relatively small tension and being in a normally-closed position with respect to communication between the transfer housing container;

(i) the second by-pass valve on the non-feeding stroke of the piston being opened by the pressure of the first food substance for permitting the passage thereof into the transfer housing with the first by-pass valve being closed by the spring of relatively great tension;

(j) the second by-pass valve on the feeding stroke of the piston being closed and the first by-pass valve being opened by the pressure of the first food substance for permitting the passage thereof from the transfer housing to and through the dispensing head and onto the second food substance.

2. In the appearance of claim 1 including, means for varying the length of the piston stroke for the control of the measure of first food substance incrementally dispensed.

References Cited

UNITED STATES PATENTS

| | | | |
|---|---|---|---|
| 2,007,113 | 7/1935 | Staples | 222—262 |
| 2,036,639 | 4/1936 | Linton | 222—262 X |
| 2,689,075 | 9/1954 | Morton et al. | 222—334 |
| 2,724,336 | 11/1955 | Egerton | 222—383 |
| 2,952,209 | 9/1960 | Scholin | 222—66 |
| 3,082,918 | 3/1963 | Lewis | 222—334 X |

ROBERT B. REEVES, *Primary Examiner.*

HADD S. LANE, *Examiner.*